Figure 1:
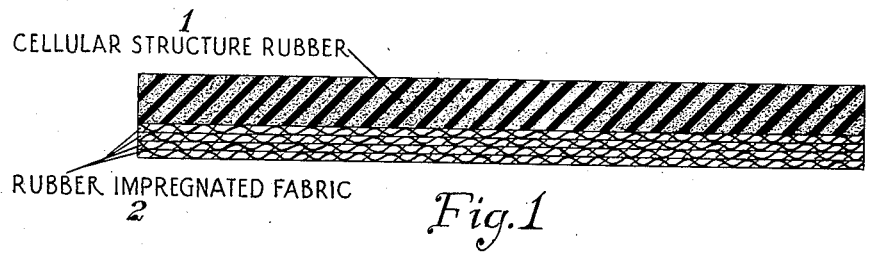

June 29, 1937.    D. J. SULLIVAN    2,085,204
ANTISKID DEVICE FOR POWER DRIVEN VEHICLES
Filed Sept. 19, 1934

INVENTOR.
David J. Sullivan
BY Frank C. Hilberg
ATTORNEY.

Patented June 29, 1937

2,085,204

UNITED STATES PATENT OFFICE 2,085,204

ANTISKID DEVICE FOR POWER DRIVEN VEHICLES

David J. Sullivan, Fairfield, Conn., assignor to E. I. du Pont de Nemours & Company, Wilmington, Del., a corporation of Delaware Application September 19, 1934, Serial No. 744,639

8 Claims. (Cl. 152—14)

This invention relates to a device for reducing the skidding of power driven vehicles, and more particularly to a device which may be attached to wheels of power driven vehicles to prevent the skidding of such vehicles on slippery streets or roadways.

The present methods in use of eliminating or reducing the tendency of power driven vehicles to skid are: (1) the use of auxiliary appliances to increase the traction of the tire, and (2) the application of a material such as resins in solution or a sticky substance directly to the tire to increase the coefficient of friction between the tire and the roadway. Under (1) may be mentioned such appliances as tire chains, emergency clamps and so-called rubber chains, which consist of rubber strips with or without embedded metallic prongs and provided with suitable fastenings for affixing around the tire of the wheel. The metal chains and emergency clamps are satisfactory for increasing the traction of the wheel in snow, slush and the like but are not satisfactory on ice because of the very low coefficient of friction between the metal and ice. The metal chains are fairly effective when new, i. e., when the surface of the links is somewhat rough but their effectiveness is lost to a considerable degree as they become worn and smooth. Such wearing is quite rapid when the chains come in contact with stretches of hard surfaced roadways which may be free from snow. On icy roadways the worn chains are essentially ineffective so far as skidding of the vehicle is concerned and may even in certain instances be dangerous.

The so-called "rubber chains" which consist of cross members of smooth solid rubber bars or strips also have a relatively low coefficient of friction with respect to a smooth wet surface such as ice. To overcome this, some types of the "rubber chains", as previously indicated, have metal prongs embedded in the rubber strips to give a better grip by breaking the smooth icy surface. The effectiveness of these prongs is only temporary since they soon wear down and become smooth and are no longer satisfactory. The so-called rubber chain has an advantage, however, over the metal chain in that it is not excessively worn in traversing stretches of roadway free of ice or snow and so does not rapidly lose its effectiveness for increasing traction of the wheel in loose materials such as snow, slush, etc.

The expedient of treating the rubber tires of power driven vehicles with various substances as previously noted is not satisfactory because the treatment is not always practical and at best is only of a temporary nature. Water tends to destroy the effectiveness of such treatments, in which instance the tire must be retreated to attain the anti-skid properties desired. The materials applied to the tire are also readily worn off by abrasion, i. e., when the tire comes in contact with a hard relatively rough roadway. It is apparent therefore, that the prior art devices are not entirely satisfactory particularly for use on icy pavements or roadways.

This invention has as an object the provision of a frictional device for use over the tires on power driven vehicles, to reduce the tendency of such vehicles to skidding on slippery pavements or roadways. A further object is the provision of a frictional device for use over the tires of power driven vehicles, which can be easily attached or detached in emergencies and which will markedly increase the traction of the wheels on slippery pavements. A still further object is the provision of a frictional device for use on the tires of power driven vehicles to prevent skidding and give increased traction on slippery pavements and roadways, and which will have marked resistance to abrasive wear when used on stretches of dry or non-slippery pavements or roadways.

These objects are accomplished by a device in which a cellular structure rubber layer has been united to a reinforcing base of single or multiply fabric and the sheet material thus formed cut into strips and provided with a suitable arrangement for attachment around the tires.

Figure 2:
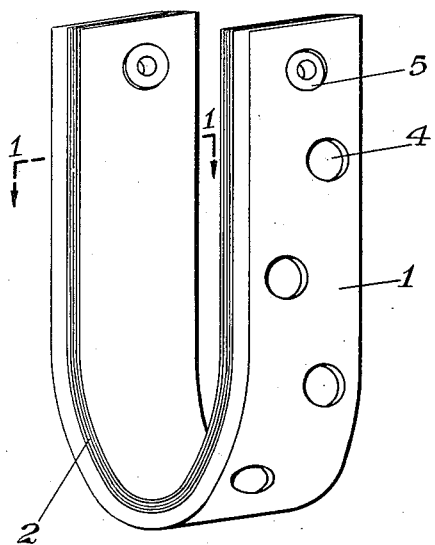
Figure 3:
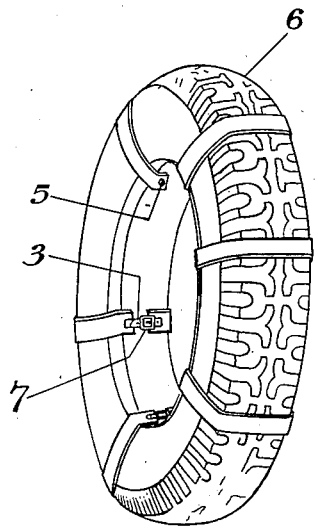

In the drawing, Figure 1 represents a section along line 1—1 in Figure 2. Figure 2 represents a plan view of the anti-skid device. Figure 3 shows a tire with the anti-skid device attached. In Figure 1, 1 represents a thick layer of cellular structure rubber, 2 indicates a four ply rubber impregnated fabric layer, 4 indicates circular depressions in the cellular structure rubber layer, and 5 shows grommets, through which a strap 3 provided with a buckle 7 is passed, for attaching the anti-skid device securely to the tire. In Figure 3, 6 indicates the tire itself.

In its preferred form the invention consists of a single or multi-plied combined fabric, the individual plies of which are impregnated with a suitable rubber composition and joined under pressure, to which is adhered a layer of a cellular structure rubber composition. This composite sheet is cut into a suitable size, depending on the size of tire to which it is to be attached, and provided with suitable means for attaching to the tires, e. g., with grommets at each end and a suitable strap passing through the grommets to hold the anti-skid device to the wheel, the plied fabric side being faced to the tread of the tire.

The invention is carried out in one of its preferred forms according to the following procedure. A suitable fabric, such as is known in the textile trade as a Number 10 duck which weighs about 14.7 ounces per square yard and has a tensile strength of approximately 225 pounds in the warp and 150 pounds in the filler, is impregnated with a rubber cement by any of the commonly used methods. By way of example, but not by way of limitation, the following example is given of a suitable rubber composition to be made into a cement:

|  | Parts by weight |
|---|---|
| Rubber (Pale crepe) | 65 |
| Rubber substitute (Brown) | 14 |
| Zinc oxide | 7 |
| Rosin | 8 |
| Burgundy pitch | 8 |
| Antioxidant | 0.75 |
| Stearic acid | 1 |
| *Thionex | 0.25 |
| *Ureka C | 0.75 |
| Sulphur | 2 |

*Trade names of accelerators well known in the rubber compounding art.

The ingredients are mixed in any suitable equipment, such as the well known rubber mill or Banbury mixer, according to procedures well known to those skilled in the art of compounding such compositions. The resultant rubber composition is then dispersed in a suitable dispersing medium, as gasoline for example, to yield the desired cement suitable for impregnating the fabric. The fabric is then impregnated and two or more of the impregnated fabric sheets are combined, forming a layer of two or more plies, depending on the service which the finished material is to receive. The material is then subjected to pressure either by passing between driven steel rollers set at close clearance or by placing in a suitable platten press in order to form a strong bond between the several plies. To this sheet base material is applied on one side in any suitable manner, preferably by calendering, a layer of a rubber compound, characterized by its ability to form a permanent cellular structure under the influence of heat and subsequent vulcanization. Such a cellular structure forming rubber composition given by way of example, and not by way of limitation, is the following:

|  | Parts by weight |
|---|---|
| Rubber (Pale crepe) | 51 |
| Carbon black | 22 |
| Zinc oxide | 7 |
| Sulphur | 2 |
| *Captax | 0.75 |
| *Thionex | 0.25 |
| Plastogen | 8 |
| Stearic acid | 1 |
| Ammonium bicarbonate | 8 |

The plied fabric base to which the cellular structure forming rubber compositions has been applied is now cut into strips of predetermined width and length and placed in a steel mold which is so designed as to impress indentations of approximately ½ inch in diameter and 1/8 inch deep into the surface of the rubber composition layer. The size and shape of the indentations may be, of course, varied to suit particular needs or desires. The mold containing the strip material is now placed in a press and heated for approximately 15 minutes at 20 pounds steam pressure. This heating causes the liberation of gas ($CO_2$) in the rubber compound and this liberation of gas produces a cellular structure in the rubber layer which structure becomes permanent by virtue of the vulcanization which also takes place during this heating. The rubber composition with which the fabric is impregnated is also vulcanized during this heating operation. After the heat treatment the strips are removed from the mold, cut to any desired size and equipped with a suitable appliance for fastening around the tire. As previously noted the strip material is placed so that the plied fabric base is in direct contact with the tread of the tire and the cellular structure layer on the outside so that it comes in direct contact with the pavement.

It is understood that the invention is not limited to the procedure described except insofar as noted in the appended claims. While the fabric noted in the description is that known in the textile industry as a No. 10 duck, it is to be understood that duck fabrics of other specifications as well as other fabrics such as Osnaburg, twill weaves, etc., may be used. The prime requisites for the fabric which constitutes the plied base is suitable tensile strength for the type of service to which the finished device is to be subjected. The rubber composition given above from which the impregnating cement is prepared, is preferred at present but no limitation is placed on the composition since wide variations are possible in the kind and amounts of the ingredients. Obvious modifications will occur to those skilled in the art, with respect to the type and quantity of accelerator, fillers, softeners, etc. The same applies to the cellular structure forming rubber composition. The rubber compound used for the cement may be dispersed in benzol, toluol or other suitable hydro-carbons as well as in gasoline. The concentration of the cement, as well as the viscosity, may be varied to suit particular requirements as, for example, the type and weight of fabric to be impregnated. The number of plies of fabric which constitute the base or support for the cellular structure rubber layer may vary from single ply to any number which may be practical, the governing choice as to number being the necessary strength desired for the service of the finished device.

The thickness of the cellular structure layer may vary between wide limits, thicknesses of from ¼ to ¾ inches having been found to yield satisfactory service. However, no limitation is placed on the thickness except within the bounds of practicability. The depressions formed by the mold in the curing press may be of any desired shape as for example, round, square, oval, diamond, etc. The finished strip may be of any desired width, such width depending largely on the size of tire to which it is to be attached. The length will also be governed by the size of the tire to which the material is to be attached. Strips 1½ inches wide and 15 inches long have been found satisfactory on a medium sized car, and in fact gave a whole winter season's wear on ice, snow and bare ground without removing them from the wheel. At the end of the season the strips were still in fairly good condition. Other shapes and sizes of course may be used or two may be arranged side by side and joined to one fastener around the tire. One grommet at each end has been found satisfactory but for very wide strips such as trucks may use, two or more will probably be necessary.

This invention presents as advantages over the present type of anti-skid devices in use the following: The spongy cellular layer of the outer face of the appliance promotes greater traction between the tire and the icy pavement than the metal chains and so-called rubber chains, which are made of a dense rubber composition and possess only slight compressibility and in addition have a smooth surface in contact with the slippery road. This marked traction is probably due to a suction effect of the minute cells of the cellular structure layer together with its marked compressibility. The anti-skid device of the invention is far more effective than the application of compositions to the tires in that the latter are at best only a temporary expedient and often fail when most needed. The efficiency of the cellular structure rubber surface is essentially unimpaired by wear as new cells are continually being exposed as the rubber composition wears away, metal chains on the other hand become smooth and lose their effectiveness and often become dangerous on slippery roadways. Tests have shown that the device of the invention is the most effective from every standpoint of the non-skid devices now known for use under conditions of loose materials (such as snow, slush, sand, etc.) and icy, slippery streets.

A further advantage is that the device of the invention is not materially affected when driven over dry pavements and its efficiency is not impaired as an anti-skid device by such service, as is the case with metal chains or the so-called rubber chains. Further the device of the invention is more easily applied to the wheels than chains and in view of its light weight, is more practical to carry than metal chains. Other advantages will be obvious to those skilled in the use of such devices.

I claim:

1. An anti-skid cross strap member for use around rubber tires comprising a base composed of a plurality of rubber impregnated fabric layers integrally joined, and adhered thereto a substantial layer of resilient rubber having a cellular structure.

2. Product of claim 1 having a rectangular shape and provided with grommets adjacent each end.

3. Product of claim 1 in which the cellular rubber layer is provided with a plurality of spaced apart indentations.

4. A strap device adapted to be disposed crosswise of a vehicle tire for non-skid purposes which comprises a roadway contact member having resilient cellular rubber adapted to be disposed between the tire and the roadway, extensions at the sides of said roadway contact member to be passed transversely around the side walls of the tire, said extensions being integrally united with said roadway contact member, and fastening means on said extensions to secure the device in place.

5. A strap device adapted to be disposed crosswise of a vehicle tire for non-skid purposes which comprises a roadway contact member having resilient cellular rubber adapted to be disposed between the tire and the roadway and in contact with the roadway, means integrally joined to said resilient rubber to reinforce the same, extensions at the sides of said roadway contact member to extend transversely around the side walls of the tire, and fastening means on said extensions to secure the device in place.

6. An anti-skid device adapted to be disposed transversely across the tread of a tire which comprises a fabric portion impregnated with rubber, a covering of cellular rubber adhered to and integrally joined with said fabric portion to provide a resilient, wear-resistant, frictional road-contacting portion, and means to extend around the tire and wheel rim for mounting the device with said fabric portion in contact with the tire tread.

7. A device in accordance with claim 6 in which the cellular rubber portion is provided with a plurality of indentations.

8. An anti-skid device adapted to be disposed across the tread of a tire which comprises a fabric portion and a cellular rubber portion, the two portions being integrally joined, the fabric portion constituting the supporting part and the rubber portion constituting the wearing surface of the device, and the fabric portion having spaced eyelets adapted to receive means for securing the device about a tire, said eyelets being located on opposite sides of the tread section.

DAVID J. SULLIVAN.